March 3, 1942.	M. A. OTTERBOURG	2,275,066
AUTOMATIC PUMP CONTROLLER
Filed Feb. 18, 1941	2 Sheets-Sheet 1

Inventor:
MARION A. OTTERBOURG
By Eaton & Brown
Attorneys

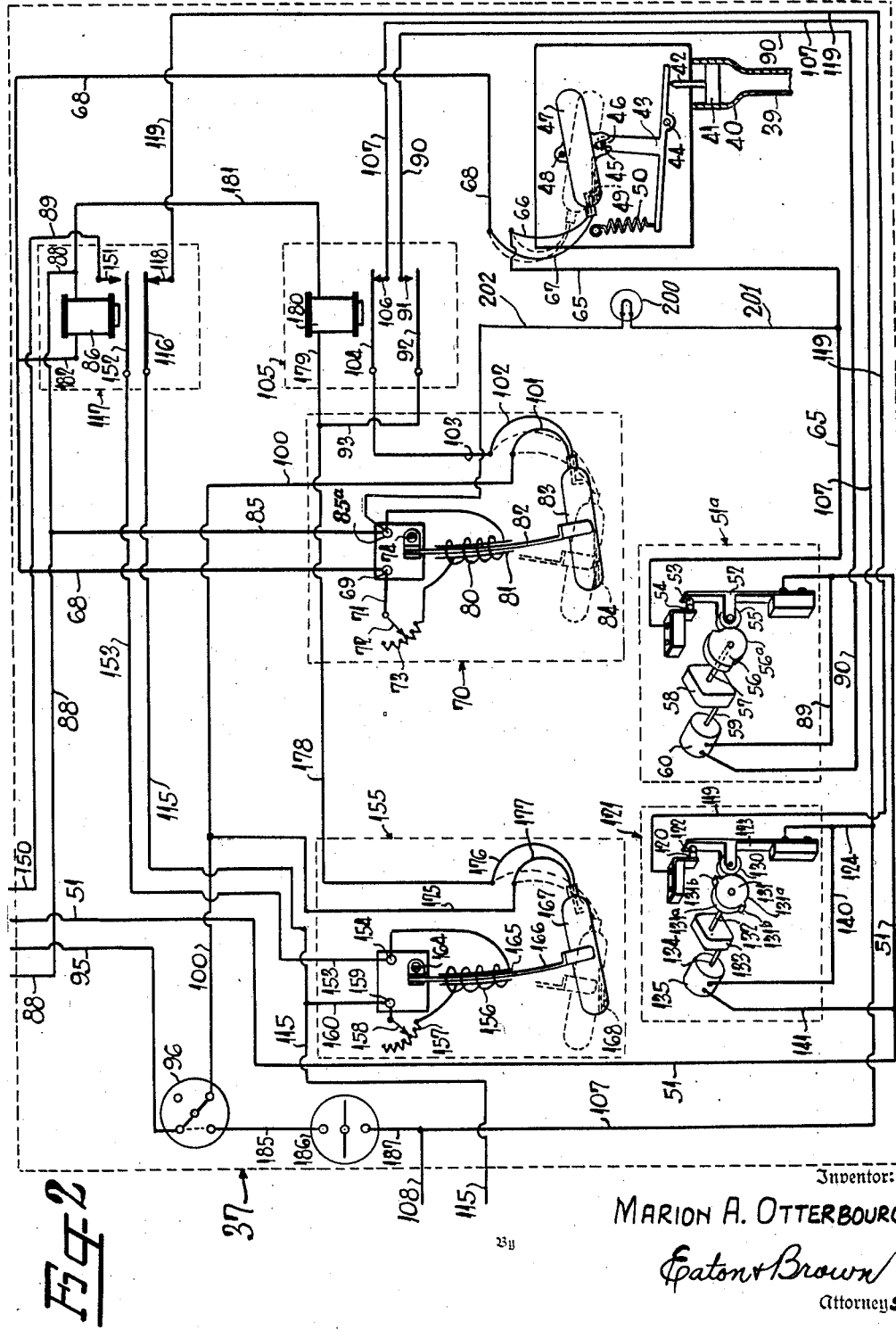

Patented Mar. 3, 1942

2,275,066

UNITED STATES PATENT OFFICE 2,275,066

AUTOMATIC PUMP CONTROLLER

Marion A. Otterbourg, Charlotte, N. C.

Application February 18, 1941, Serial No. 379,404

8 Claims. (Cl. 103—25)

This invention relates to an apparatus for automatically maintaining a supply of water in tanks, reservoirs and the like and forms a continuation in part of my co-pending application, Serial Number 330,550 filed April 19, 1940.

More particularly, it is designed for the operation of water towers and tanks in which the water level constantly changes and in which the tank is removed a considerable distance from the source of supply. For example, it frequently occurs in supply tanks for railroad engines that it is necessary to locate the water supply tank several miles from the pumping station. In order to maintain an available supply of water, within the tank between predetermined levels, some direct connection is usually made between the tank and the pumping station whereby the pump will be started or stopped as the occasion may require.

Heretofore, various mechanisms have been employed, the most commonly used being that of a mechanical float in the tank which operates a suitable switch to start the motor to the pump when the low level was reached and which likewise cuts off the switch when the high level was reached. This made it necessary to provide a control line between the pumping station and the water supply tank which adds greatly to the cost. In addition, the mechanical float frequently becomes frozen or out of order especially in cold weather, thereby rendering the starting and stopping means ineffective.

In other forms, the mechanical float as well as the lines have been eliminated and special presure operated switches have been employed for starting and stopping the pump. As has been stated, the pump is frequently located several miles from the tank and therefore a considerable friction head is incurred by pumping the water from between these two points; consequently, it has been impractical to stop the motor by virtue of the pressure within the tank because the friction in the pipe and the variable differences in the levels of water will cause the head to vary to such an extent that the stopping will not be within the required limit. When the pressure method is used for stopping the motor, it has frequently occurred that the tank will overflow before the pressure is registered on the gauge at the pump house.

It is therefore an object of this invention to provide means for starting and stopping a pump for maintaining a head of water between two levels in the tank, comprising means operated by the static head of said tank for starting the pump and means operated by a time motor for stopping the pump after said motor has been allowed to run for a predetermined interval. It is evident that when the water in the tank reaches its low level there is no flow in the pipe which connects the tank to the pump; consequently, the static head remains constant. On the other hand, after the pump has been allowed to run in order to pump additional water into the tank, the head of water cannot be accurately determined as the water is constantly flowing within the pipe. This difficulty is produced by the fact that the pipe line cannot be perfectly constructed so that there will be no air pockets or friction therein. These elements contribute to a varying pressure on the gauge at the pumping end of the line. Also where there is a centrifugal pump employed for lifting the water from a reservoir into the tank, the difference in the elevation of the water level in the reservoir will also cause the registered apparent head to change due to the load which is placed on the centrifugal pump. By providing a means operated by the static head for starting the pump when the motor reaches its low level and using a suitable clock motor or time device, for stopping the pump after it has pumped a predetermined interval, it is evident that the water may be accurately maintained between two levels since the starting point can be accurately determined from the static head, and the stopping point can be accurately determined from the timed motor.

It is another object of this invention to provide an apparatus of the class described in combination with a safety appliance for the protection of the motor and pump. If for any reason, the pump should fail to pick up water after a predetermined number of attempts, the safety appliance will cut off the pump motor. This pump will remain cut off until the switch is manually reset and of course before it is reset the operator will have an opportunity to remedy the existing trouble. Such a safety appliance will prevent damage to the motor and the pump which results from the failure of the pump to pick up water from the reservoir and force it to a suitable stand pipe.

Another very important result is obtained by using the above-named safety feature, namely, the prevention of a complete water failure in the tank or standpipe as a result of the pump continuously operating on air. Ordinarily the water would be drawn from the tank in the usual amounts while the pump continues to operate without lifting any water into the tank and as a result, there would, of course, eventually be a complete failure of water supply. However, with the use of the invention, when the failure of the pump to lift water is due to accumulation of air, the periodic stop and start feature of the device will usually act to cause the pump to take hold and deliver water during one of the successive automatic starting and stopping operations, thereby preventing a water failure. Also there is a pilot light which indicates imminent water failure.

Some of the objects of the invention having been stated, other objects will appear as the description proceeds, when taken in connection with the accompanying drawings, in which—

Figure 2 is a wiring diagram of the circuits for controlling the pump motor switch.

Figure 1:
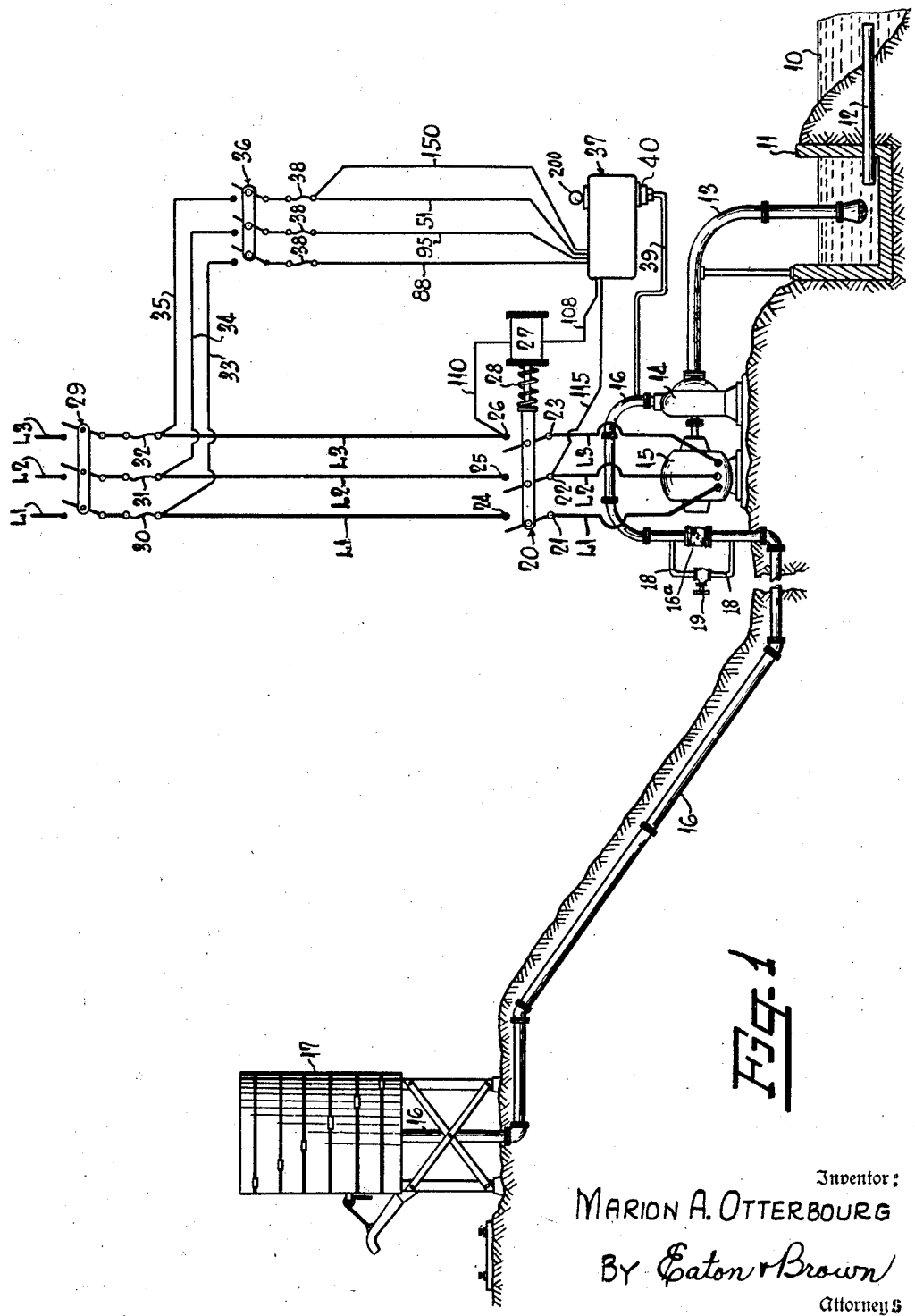
Figure 1 shows a combined structural and diagrammatic view of the invention.

Referring more specifically to the drawings, the numeral 10 denotes a suitable source of water supply such as a lake or small pond in a stream, which supplies water to a reservoir 11 by means of a pipe 12. An intake pipe 13 has the lower end thereof disposed within this reservoir and has its upper end secured to the intake end of a suitable pump, which in the present instance is a centrifugal pump 14, said pump being driven by an electric motor 15.

An outlet pipe 16 having a check valve 16a therein, leads from pump 14 to a stand-pipe or water tank 17 which may be disposed several miles distant. A by-pass pipe 18 leads around the check valve, said by-pass having a hand valve 19 therein which is used while priming the pump. In the construction of pipe line 16, it is necessary to substantially follow the contour of the earth's surface thereby causing many irregularities and bends in the pipe line. These bends and irregularities tend to add to the friction of the flow as well as to form air pockets therein. All of these features change from day to day thereby causing the pressure at the outlet of the centrifugal pump 14 to vary. It is, therefore, seen that it is impossible to accurately determine the head of the water which might be in the tank 17 by measuring the pressure at the outlet of the pump 14 while the water is flowing in the pipe from the pump to the tank. Therefore, in order to stop the motor 15 after it has pumped the water to a predetermined level within the tank 17, it is necessary to start this motor 15 by virtue of the static head after it has been lowered to a predetermined level and then provide means for causing the pump to run for a predetermined time interval and then be automatically cut off. Since the low level can be accurately determined by the static head and the amount of water which pump 14 will pump within a predetermined time interval can be accurately determined, the high and low water heads within tank 17 can be accurately maintained in this manner.

The motor 15 has suitable leads L1, L2 and L3, which supply the electric current. These leads have a conventional three blade switch 20 placed therein, said blades being pivoted as at 21, 22 and 23 and having the free ends adapted to contact terminals 24, 25, and 26 respectively. Switch 20 is moved to closed position by a suitable magnet 27 and is held in open position by a suitable spring 28.

The leads L1, L2 and L3 also have a three blade service switch 29 therein which is manually closed and opened. Suitable fuses 30, 31 and 32 are placed in the leads L1, L2 and L3, respectively. At points in lines L1, L2 and L3 between the fuses and the three blade switch 29, suitable conductors 33, 34 and 35 lead to another three blade switch 36.

From the switch 36, wires 51, 88 and 95 and 150 lead to a suitable control unit 37 and each of the wires has a fuse 38 therein at a point near the switch 36. It will be noted by referring to Figure 1 that wire 110 leads from terminal 26 through the magnet 27 and then another wire 108 leads from the other side of the magnet 27 into the control unit 37. Also a wire 115 leads from the point 22 on line L2 into a control unit 37. The function of the wires 51, 88, 96 and 150, as well as wires 108, 110, 115, will be later described in connection with their respective circuits.

A pipe 39 leads from the pipe 16 at a point near the outlet side of the pump 14. The other end of pipe 39 has an enlarged portion 40 in which is mounted a piston 41. The upper end of which has a pin 42 contacting a lever 43. This lever is pivoted as at 44 and has an upstanding arm from which pin 45 extends laterally into a suitable slot 46, of a mercury tube 47. This tube is pivoted as at 48 and has a suitable supply of mercury 49 therein. A spring 50 normally tends to tilt the mercury tube to the bold line position as shown in Figure 2.

The piston 41 is normally forced downwardly by the spring 50 and is adapted to be forced upwardly by virtue of the pressure in the pipes 16 and 39, due to the starting of the pump 14. Upon the starting of the pump, and upon water being forced into the pipe 16 under pressure, the corresponding pressure will be transmitted through pipe 39 to the lower side of the piston 41 in Figure 2. This will force the piston upwardly, rotate lever 43 in a counter-clockwise manner about pivot point 44 thereby rotating the mercury tube 47 about its pivot point 48 in a clockwise direction from the bold line position to dotted line position.

*Control circuit for thermal switch 70*

When the apparatus is in position for operation, the switches 29 and 36 (Figure 1) are closed, thereby establishing a connection between the leads L1, L2 and L3, and the control unit 37. When the static pressure in pipe lines 16 and 39 reaches a predetermined low, the mercury tube 47 will be tilted from dotted line position to bold line position as previously described. This will close the circuit between wires 66 and 67 thereby allowing the current to flow from lead L3 through wire 35, switch 36, fuse 38, wire 51 metallic leaf 52 (Figure 2), contact 53, contact 54, wire 65, wire 66, mercury 49, wire 67, wire 68, post 69 of switch 70, wire 71, rheostat arm 72, rheostat 73, heater coil 80, wire 85, wire 83, back through fuse 38 (Figure 1), switch 36, wire 33, and back to lead L1 thus completing the circuit. The heater coil 80 is adapted to encircle a metallic strip 81 which is disposed around supporting arm 82 of switch 70. The combination of members 81 and 82 is called a bi-metallic strip, having two strips of metal with different coefficients of expansion, and when sufficiently heated the members 81 and 82 are deflected from bold line position to dotted line position. Of course when the arm 82 is deflected, the mercury tube 83 will likewise be deflected, thus causing the mercury 84 to flow to the other end of the tube and close the contact between wires 101 and 102. The thermal switch assembly may be adjusted by manipulating the screw 74 and rheostat arm 72 so as to regulate the timing of the tilt necessary to cause the mercury to flow from one end of the tube to the other. For example, if it is desired to cause the mercury tube to tilt within one and one-half minutes, a different initial angularity would be set than would be the case if a shorter time interval were desired. In the present set-up, let us assume that the mercury tube is set so that it would require about one and one-half minutes to heat coil 80 sufficiently to deflect the members 81 and 82 to cause the tube 83 to move from bold line position to dotted line position to close the circuit between wires 101 and 102.

Magnetic motor switch circuit

Upon the closing of the circuit between wires 101 and 102, the current is allowed to flow from lead L2 to wire 34, switch 36, fuse 38, wire 95, three way manually controlled switch 96, wire 100, wire 101, mercury tube 84, wire 102, wire 103, switch arm 104, contact 106, wire 107, wire 108 (Figure 2), magnet 27, wire 110 and terminal 23 of lead L3, thereby energizing the magnet 27 and causing the blades of switch 20 to contact terminals 24, 25, 26 disposed in the circuit leading to the motor 15 and starting the pump 14 in operation. The friction head created by the pump action will immediately restore the pressure switch, which is designated by reference characters 39 to 50 inclusive, to dotted line open position, thus de-energizing the thermal switch 70 in a set time causing the bi-metallic strip to assume its normal position, which of course, will cause the mercury tube 83 to be restored to bold line position at which time the circuit is broken between wires 101 and 102. It will take approximately a minute to a minute and a half before this action takes place on account of the fact that coil 80 will gradually cool after the thermal circuit is opened. If it were not for a holding circuit, which will presently be described, the motor 15 would stop at this time, because the magnet 27 would be de-energized upon the restoring of the mercury tube 83 to original position.

Motor holding circuits

When the magnetic switch 20 is closed by the above-named circuit, for starting the motor 15, the current is simultaneously taken from the terminal 22 of lead L2. The current flows through wire 115, switch arm 116, contact 118, wire 119, contact 120 of time switch 121, contact 122, metallic leaf 123, wire 124 and back to the wire 107, thus completing the holding circuit. The motor 15 will now run until the time interval switch 121 has completed a cycle which will cause the contacts 120 and 122 to separate which, in turn, will cause the magnet 27 to be deenergized to stop the motor.

Time interval switch and circuit

In Figure 2 it will be seen that the metallic leaf 123 has a roller 130 associated therewith. This roller is adapted to press against the periphery of cam 131 by virtue of the inherent resiliency in the metallic leaf. It is seen that the cam 131 has a low side 131a which, when contacted by roller 130 will allow the contact 122 to move into engagement with contact 120. In other words, the time that it is desired for the motor 15 and pump 14 to operate and pump water from the reservoir 11 to the tank 17 will be determined by the length of the low side 131a. Therefore, the shape of the cam 131 will largely be determined by the capacity of the tank and the amount of water desired to be pumped during any one time interval.

The cam 131 is mounted upon a suitable shaft 132, the other end of which leads into a suitable gear reduction housing 133. Leading from the housing 133 is a motor shaft 134 of motor 135. The circuit for operating this motor comprises a wire 140 which leads from one side of the motor to the wire 124. Another wire 141 leads from the other side of the motor to wire 15, thereby supplying current to motor 135 when the motor 15 and the pump 14 is in operation, and of course depriving the motor 135 of current when the pump 14 and the motor 15 are not in operation.

Circuit for thermal switch 155

Now repeating the starting operation just described, assume that the pump 14 did not pick up water and therefore no friction head was created to restore the pressure switch comprising parts 39 to 50 inclusive to open position. The contact between wires 66 and 67 will remain closed and thereby hold the mercury tube 83 in dotted line position and also keep the bi-metallic strip of unit 70 heated. The contacts between wires 101 and 102 will be kept closed and the circuit comprising members 107, 108, 27 and 110 will remain energized. The relay 86 which is in parallel with the thermal switch 70, will be energized through a circuit, comprising members L1, 33, 88, 86, 182, 63, 67, 66, 65, 53, 54, 52, 51, 34 and L2 causing contact members 151 and 152 to be connected. This connection will permit the current to flow from lead L3, wire 35, switch 36, fuse 38, wire 150, contact 151, switch arm 152, wire 153, post 154, heating coil 156, rheostat 157, rheostat arm 158, post 159, wire 160, wire 115, and to terminal 22 of lead L2. Upon the closing of the circuit, the coil 156 of the intermittent thermal switch 155 will be heated thereby deflecting a bi-metallic strip comprising members 165 and 166. The lower end of member 166 supports a mercury tube 167 having mercury 168 therein. When the bimetallic strip has been heated sufficiently long, the lower end thereof will deflect the mercury tube 167 from bold line position to dotted line position thereby closing the circuit between wires 176 and 177. The time interval which is necessary to cause the tube 167 to tilt the necessary amount for locking the circuit can be adjusted by manipulation of the screw 164 and rheostat arm 158. In the present instance, let us assume that this switch can be heated sufficiently to close the circuit between the wires 176 and 177 within two minutes, after the heating coil has been subjected to electrical current.

Intermittent stopping circuit

Upon the closing of the circuit between wires 176 and 177 the current is allowed to flow from the wire 100 through wire 175, wire 176, mercury 168, wire 177, wire 178, wire 179, relay coil 180, to lead L1. This will energize the relay coil 180 which, when energized, causes the switch arm 104 to move out of engagement with contact 106 and also cause the switch arm 92 to move into contact with the terminal 91. When the switch arm 104 moves from the terminal or contact 106, the circuit in which the mercury tube 83 is disposed will be broken, and the magnetic switch which has been held closed through the medium of the starting circuit comprising members 100 and 108 inclusive, already described, will be opened thus de-energizing the magnet coil 27. When relay coil 180 is energized the switch arm 92 is raised into contact with terminal 91. It is now seen that when the magnetic switch 28 is open, no current is available for the conductor 115, therefore, the heating coil 156 of the thermal switch 155 will not receive current thereby causing the metallic strip 165 to cool and assume the normal bold line position within a set time. When this metallic strip cools to restore the mercury tube 167 to bold line position to open the circuit between wires 176 and 177, the coil relay 180 will again be de-energized thereby causing the switch arm 104 to move into contact with terminal 106 to again energize the magnet switch relay 27 and start the motor in the same manner as previously described. If the pump picks up water on this operation, it will continue to run as previously described, until the cut out by the time interval switch 51a. Otherwise the operation will be repeated as just described, relative to the failure to pick up water, as it will be seen that so long as pump 14 fails to pick up water mercury tube 47 will remain in closed position, continuing to energize mercury switch unit 70 and relay coil 86. Relay coil 86 when energized interrupts the holding circuit to magnet 27, and when de-energized, it closes the holding circuit.

Relay coil 86 also operates thermal switch 155, but in normal operation the switch is not closed, unless the pump fails to pick up water for a set time. We can assume the switch is set for two minutes for purpose of description. Let us assume that switch 70 closes in one and one-half minutes. Upon the closing of the last-named circuit, the mercury tube 47 will be tilted to open position thereby de-energizing magnet 86 resulting in the cooling of thermal switch 155 before it has been heated long enough to be closed. Therefore, it is only when the pump 14 fails to pick up water that the mercury tube 47 remains closed as long as two minutes which time interval is necessary for the switch 155 to be closed so as to operate the definite time switch 51a.

*Definite time switch circuit*

It will be noted by referring to relay coil 180 in Figure 2 that while this relay was energized and the switch arm 92 raised into contact with terminal 91 and that the current was caused to flow from wire 178, through wire 93, contact arm 92, terminal 91, wire 90, motor 60 of time switch 51a, wire 89, and back to wire 51 thus completing the circuit, causing the motor 60 to operate during the period that the relay coil 180 was energized and during each succeeding operation of said relay until after a predetermined number of operations. After a predetermined number of failures to pick up water, the low side 56a of cam 56 will move out from beneath roller 55 thereby causing the roller to be on the high side of cam. This will break the circuit between cotacts 53 and 54 thereby preventing further automatic operation of the system until conditions causing the trouble have been corrected. At this time the automatic control can be cut back in by manual reset of the definite time switch 51a. In addition to the above-mentioned operation, it will be seen that all three phases of the motor circuit are required to complete any step of the automatic controling device, thereby rendering complete single phase protection for three phase motors.

*Signal circuit*

In order to provide means for indicating when the water is low in the tank after the pump has been finally cut off, a suitable pilot light and signal circuit is provided. The pilot light is indicated by reference character 200 and is installed between wires 201 and 202, said wires having their other ends connected to wire 65 and post 85a, respectively. The pilot light normally burns, but is cut off when the final cut-out is actuated to open contact between contacts 53 and 54.

In the drawings and specification there has been set forth a preferred embodiment of the invention and although specific terms are employed, they are used in a generic and descriptive sense only and not for purposes of limitation, the scope of the invention being set forth in the following claims.

I claim:

1. Apparatus for maintaining a liquid level in a tank between a predetermined low level and a predetermined high level, comprising a pump and a pipe line between the pump and the tank, and electric motor for driving the pump, means operable by a predetermined low pressure for starting the motor, means rendered active by the starting of the motor for maintaining the motor energized for a predetermined time after the starting thereof, means for stopping said motor for a predetermined time interval upon the failure of the pump to pick up water, and means for again starting and maintaining the motor and pump in operation for a second predetermined interval.

2. In a water supply system having a tank, an electric motor, a pump driven by the motor, a pipe leading from the pump to said tank, an electric circuit to said motor, means operable by the static pressure in the pipe line for closing the circuit to the motor, means independent of the pressure in said pipe for holding said circuit closed for a predetermined time after the starting thereof, means for opening said circuit for a predetermined time interval upon the failure of the pump to pick up water, means for again closing said circuit for a second predetermined interval to maintain the motor and pump in operation, and means for successively repeating the opening and closing of said circuit for a predetermined number of times upon the failure of the pump to pick up water.

3. In a water system having a tank, a pipe line leading from the tank, a pump connected to the other end of said pipe line, an electric motor for driving said pump, an electrical circuit connected to said motor, a normally open switch in said circuit, means operable by a predetermined low pressure in said pipe line for closing said switch and starting said motor, means controlled by the starting of the motor and operable for a predetermined time after the motor has been started for maintaining said switch in closed position, means for opening said circuit for a predetermined time interval upon the failure of the pump to pick up water, means for again closing said circuit for a second predetermined interval to maintain the motor and pump in operation, and means for successively repeating the opening and closing of said circuuit for a predetermined number of times upon the failure of the pump to pick up water.

4. In a water system having a liquid pump and a tank disposed at a higher level than the pump and a pipe line connecting the pump and the tank, pressure operated means in said line disposed near the pump, a motor for driving the pump, means controlled by a predetermined low pressure in said line for starting said motor, means for maintaining said motor in operation for a predetermined time interval, means for stopping said motor for a predetermined time interval upon the failure of the pump to pick up liquid, means for again starting and maintaining the motor and pump in operation for a predetermined interval, and means for successively repeating said starting and stopping of said motor and pump for a predetermined number of times upon the failure of the pump to pick up liquid.

5. Apparatus for maintaining a supply of water in a tank and the like between a predetermined low level and a predetermined high level, which comprises a pump having an intake pipe and a discharge pipe, said discharge pipe having its other end connected to the lower portion of said tank, an electric motor for driving said pump, a pressure operated switch connected to said discharge pipe and adapted to be closed upon the pressure in the discharge pipe reaching a predetermined low point and to be opened, when a predetermined high pressure is reached, said switch being disposed in close proximity to the pump, an electrical circuit connected to the motor for driving the same, a magnetic switch in said electrical circuit, a control circuit, a relay in said control circuit for operating said magnetic switch, a holding circuit for said relay and being operated from said control circuit, a time switch in the holding circuit, means operable by said pressure operated switch for closing said relay switch to cause the holding circuit to be energized, and a time controlled element in said holding circuit for holding said time switch closed to hold said magnetic switch closed for a predetermined time after the control circuit is broken by the increased pressure upon said pressure operated switch resulting from pumping.

6. Apparatus for maintaining a supply of water in a tank and the like between a predetermined low level and a predetermined high level, which comprises a pump having an intake pipe and a discharge pipe, said discharge pipe having its other end connected to the lower portion of said tank, an electric motor for driving said pump, a pressure operated switch connected to said discharge pipe and adapted to be closed upon the pressure in the discharge pipe reaching a predetermined low point and to be opened when a predetermined high pressure is reached, said switch being disposed in close proximity to the pump, an electrical circuit connected to the motor for driving the same, a magnetic switch in said electrical circuit, a control circuit, a relay in said control circuit for operating said magnetic switch, a holding circuit for said relay and being operated from said control circuit, a time switch in the holding circuit, means operable by said pressure operated switch for closing said relay switch to cause the holding circuit to be energized, a time controlled element in said holding circuit for holding said time switch closed to hold said magnetic switch closed for a predetermined time after the control circuit is broken by the increased pressure upon said pressure operated switch resulting from pumping, a second normally closed time switch in said control circuit, a second time controlled element for opening said second time switch to stop said motor, and means for operating said second element for a predetermined time interval upon the failure of the pump to create an increased pressure upon the pressure operated switch.

7. Apparatus for maintaining a supply of water in a tank and the like between a predetermined low level and a predetermined high level, which comprises a pump having an intake pipe and a discharge pipe, said discharge pipe having its other end connected to the lower portion of said tank, an electric motor for driving said pump, a pressure operated switch connected to said discharge pipe and adapted to be closed upon the pressure in the discharge pipe reaching a predetermined low point and to be opened when a predetermined high pressure is reached, said switch being disposed in close proximity to the pump, an electrical circuit connected to the motor for driving the same, a magnetic switch in said electrical circuit, a control circuit, a relay in said control circuit for operating said magnetic switch, a holding circuit for said relay, and being operated from said control circuit, a time switch in the holding circuit, means operable by said pressure operated switch for closing said relay switch to cause the holding circuit to be energized, a time controlled element in said holding circuit for holding said time switch closed to hold said magnetic switch closed for a predetermined time after the control circuit is broken by the increased pressure upon said pressure operated switch resulting from pumping, and means for alternately starting and stopping said pump for predetermined intervals of time upon the failure of the pump to create an increased pressure upon the pressure operated switch.

8. Apparatus for maintaining a supply of water in a tank and the like between a predetermined low level and a predetermined high level, which comprises a pump having an intake pipe and a discharge pipe, said discharge pipe having its other end connected to the lower portion of said tank, an electric motor for driving said pump, a pressure operated switch connected to said discharge pipe and adapted to be closed upon the pressure in the discharge pipe reaching a predetermined low point and to be opened when a predetermined high pressure is reached, said switch being disposed in close proximity to the pump, an electrical circuit connected to the motor for driving the same, a magnetic switch in said electrical circuit, a control circuit, a relay in said control circuit for operating said magnetic switch, a holding circuit for said relay and being operated from said control circuit, a time switch in the holding circuit, means operated by said pressure operated switch for closing said relay switch, to cause the holding circuit to be energized, a time controlled element in said holding circuit for holding said time switch after the control circuit is broken by the increased pressure upon said pressure operated switch resulting from pumping, means for alternately starting and stopping said pump for predetermined intervals of time upon the failure of the pump to create an increased pressure upon the pressure operated switch, a second normally closed time switch in said control circuit, a second time controlled element for opening said second time switch to stop said motor, and means for operating said second element for a predetermined time interval upon the failure of the pump to create an increased pressure upon the pressure operated switch.

MARION A. OTTERBOURG.